United States Patent
Lee et al.

(10) Patent No.: US 8,947,228 B2
(45) Date of Patent: Feb. 3, 2015

(54) DIAGNOSTICS OF HOT-STANDBY/REDUNDANT OWNER SYSTEM IN AN ETHERNET/IP ADAPTER DEVICE

(75) Inventors: Kenneth Lee, Cambridge, MA (US); Vijay Vallala, North Andover, MA (US); Jian Pan, Salem, NH (US)

(73) Assignee: Schneider Electric Industries SAS, Rueil Malmaison (FR)

( * ) Notice: Subject to any disclaimer, the term of this patent is extended or adjusted under 35 U.S.C. 154(b) by 256 days.

(21) Appl. No.: 13/440,592

(22) Filed: Apr. 5, 2012

(65) Prior Publication Data
US 2013/0265160 A1     Oct. 10, 2013

(51) Int. Cl.
*G08B 21/00*     (2006.01)

(52) U.S. Cl.
USPC ............ 340/540; 439/489; 709/243; 709/280

(58) Field of Classification Search
CPC .. H04L 29/08072; H04L 29/06; G08B 21/00; G09F 9/33; H01R 9/096; H01R 29/00; H04Q 1/14; G06Q 40/10; G06F 9/4411; G06F 13/385; G06F 3/023; G06F 3/038
USPC ............ 340/815.45, 540; 709/213, 208, 231, 709/250, 243; 439/65, 49, 490, 489; 705/30; 348/14.08; 455/70; 47/72; 370/217, 248; 710/104, 73
See application file for complete search history.

(56) References Cited

U.S. PATENT DOCUMENTS

| | | | |
|---|---|---|---|
| 7,023,795 B1 | 4/2006 | Hwu | |
| 7,590,702 B2* | 9/2009 | Swales et al. | 709/208 |
| 8,061,081 B2* | 11/2011 | Weder | 47/72 |
| 2002/0083182 A1* | 6/2002 | Alvarado et al. | 709/231 |
| 2006/0015651 A1* | 1/2006 | Freimuth et al. | 709/250 |
| 2009/0112742 A1* | 4/2009 | Sumino et al. | 705/30 |
| 2009/0172193 A1* | 7/2009 | Lee | 709/243 |
| 2010/0081394 A1* | 4/2010 | Mashimo | 455/70 |
| 2010/0120264 A1* | 5/2010 | Caveney et al. | 439/49 |
| 2010/0176962 A1* | 7/2010 | Yossef | 340/815.45 |

OTHER PUBLICATIONS

Power, Control and Information Solutions Headquaters; 1447-SDN DeviceNet Scanner Module; Publication 1747-IN058F-EN-Dec. 2010 (20 pages).*
ControlNet International and Open DeviceNet Vendor Association; EtherNet/IO Adaptation of CIP Specification, Publication: Jun. 5, 2001 (122 pages).*
The CIP Networks Library, vol. 1, Common Industrial Protocol (CIP™), Edition 3.9, Nov. 2010, 1418 pages.
The CIP Networks Library, vol. 2, EtherNet/IP Adaptation of CIP, Edition 1.10, Nov. 2010, 280 pages.

* cited by examiner

*Primary Examiner* — Steven Lim
*Assistant Examiner* — Kaleria Knox
(74) *Attorney, Agent, or Firm* — Banner & Witcoff, Ltd.

(57) ABSTRACT

Method, apparatuses, and software are described, in which an adapter in an EtherNet/IP network may determine whether a first redundant owner connection between the adapter and a first scanner is open. If it is determined that the first redundant owner connection is not open, then a network status light or other indicator of the adapter may be caused to emit a solid green color or otherwise indicate a first status if a second redundant owner connection between the adapter and a second scanner is open, and to emit a flashing red color or a flashing green color (or otherwise indicate a second or third status) if no redundant owner connection to the adapter is open.

18 Claims, 3 Drawing Sheets

US 8,947,228 B2

DIAGNOSTICS OF HOT-STANDBY/REDUNDANT OWNER SYSTEM IN AN ETHERNET/IP ADAPTER DEVICE

BACKGROUND

The existing ODVA network status light standard in an EtherNet/IP network does not adequately address the situation in which there are multiple redundant owners for a given adapter. For instance, if one of a plurality of redundant owners times out from a lost a network connection with an adapter, then the network status light of the adapter would begin flashing red. While this may make sense in the environment of a single exclusive owner, this would likely be confusing to the user of the adapter in a multiple redundant owner scenario. Thus, an ODVA-compliant network status light would only take into account the status of the timed-out owner, and not the status of the new redundant owner. Thus, in a redundant owner scenario, the ODVA-compliant network status light may operate in a misleading manner.

SUMMARY

Various aspects as described herein are directed to apparatuses, systems, methods, and software that may cause a network status indicator, such as a network status light, to operate in a manner more appropriate for a multiple redundant owner scenario.

For example, various aspects as described herein are directed to a method comprising determining, by an adapter (or other slave device) in an EtherNet/IP network, whether a first redundant owner connection between the slave device and a first scanner (or other master device) is open. The method may further comprise, if it is determined that the first redundant owner connection is not open, then causing a network status indicator of the adapter device to indicate a first status if a second redundant owner connection between the adapter device and a second scanner device is open, and to emit a second status or a third status if no redundant owner connection to the slave device is open.

Further aspects may be directed to, for example, an apparatus, comprising a processor, a network status indicator, and a communication interface configured to be coupled to a network the process may be configured to cause the network status indicator to indicate a first status when at least one of a plurality of redundant owner connections to the communication interface is open, even if another of the plurality of redundant owner connections is closed or timed out, and to cause the network status indicator to indicate a second status or a third status when there are no open redundant owner connections to the communication interface.

Still further aspects may be directed to, for example, an apparatus, comprising a processor and a network status light. The processor may be configured to determine whether a first redundant owner connection between the apparatus and a first scanner is open, and if it is determined that the first redundant owner connection is not open, cause the network status light to emit a solid green color if a second redundant owner connection between the apparatus and a second scanner is open, and to emit a flashing red color or a flashing green color if no redundant owner connection to the apparatus is open.

Even further aspects may be directed to, for instance, a non-transitory computer-readable medium storing computer-executable instructions for a computer to perform steps. The steps may comprise causing a network status light of an apparatus to emit a solid green color when at least one of a plurality of redundant owner connections to the apparatus is open, even if another of the plurality of redundant owner connections is closed or timed out, and causing the network status light to emit a flashing red color or a flashing green color when there are no open redundant owner connections to the apparatus.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
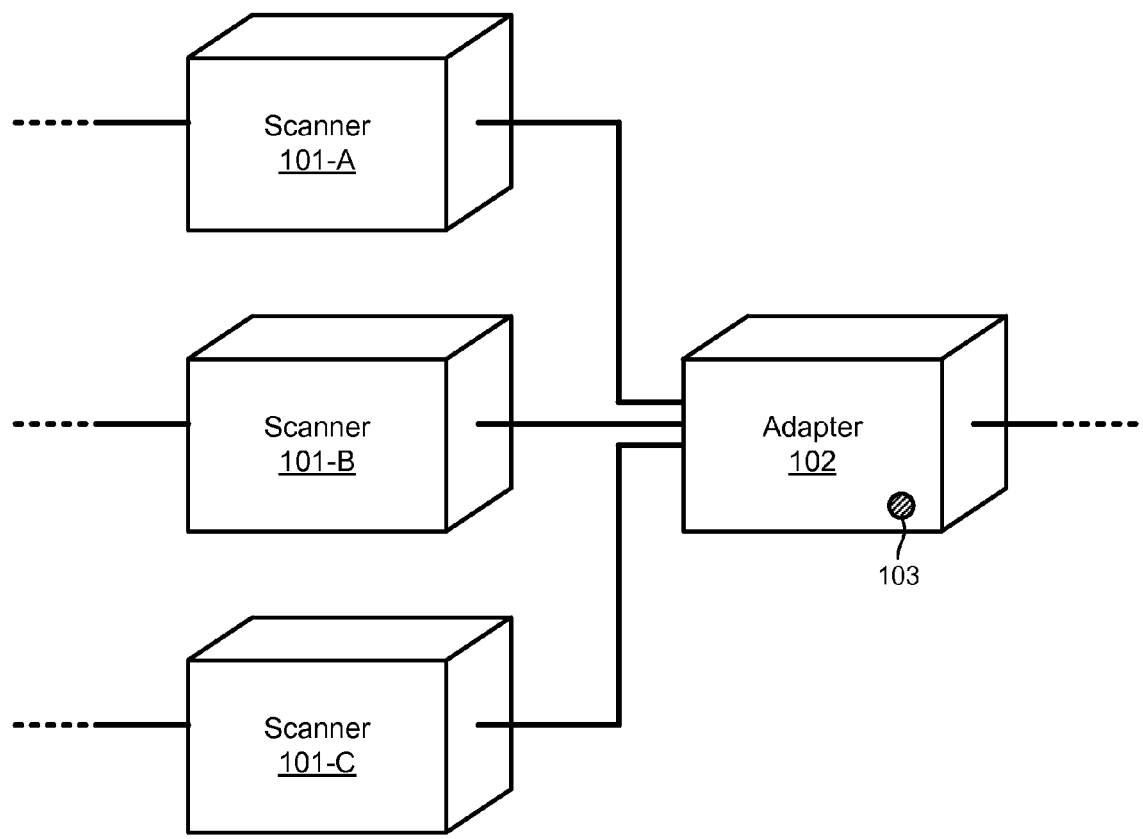
FIG. 1 is a block diagram of an example network of devices, in accordance with one or more aspects as described herein.

FIG. 1 is a block diagram of an example network (or portion thereof) of devices that may be used to implement one or more of the features and functions as described herein. The network may include one or more master/slave and/or producer-consumer relationships between devices. For example, the network may include one or more devices functioning as master devices, such as scanners 101-A, 101B, and 101C, that may each be coupled to and act as a master to one or more devices each functioning as a slave device, such as adapter 102. It will be understood that the network may include many more master devices and/or slave devices with many more master/slave relationships, and that FIG. 1 shows just one family of master/slave relationships for ease of understanding.

The network of FIG. 1 may be any type of network, such as but not limited to an EtherNet/IP network. The network may also follow one or more network standards, such as one or more network protocols for the devices to communicate with each other. For example, an EtherNet/IP network standard may be followed by the network, such as the Open Device Vendors Association (ODVA) standard. The ODVA standard specifies various behaviors and communications between the devices, including the master/slave relationship. For instance, according to the ODVA standard as described in "The CIP Networks Library, Volume 1, Common Industrial Protocol (CIP)", published by ODVA, the adapter 102 may have an exclusive owner (master), such as scanner 101-A. Or, according to the ODVA standard, the adapter 102 may have multiple redundant owners, such scanners 101-A, 101-B, and 101-C. Under the redundant owner scenario, only one of the scanners 101 is the owner at any given time. If that owner loses a network connection with the adapter 102 or is otherwise unable to carry out is ownership function, then another one of the scanners 101 automatically becomes the owner.

The adapter 102 may include a network status indicator, such as one or more network status lights 103, for indicating a network status from the point of view of adapter 102. The network status indicator may operate in accordance with a network standard, such as the above-mentioned ODVA standard. The network status indicator may be capable of producing, for example, various different colors and/or light patterns (e.g., flashing or steady) to indicate the status. Examples of status indications used by the ODVA standard (where the network status indicator is a network status light 103) include a steady green, a steady red, a flashing green, a flashing red, alternate flashing between green and red, and an off (non-lit) status. Other status indications, such as other colors, flashing patterns, and/or color patterns may also be produced as desired. Where the network status light 103 is only a single physical light, the network status light 103 may be configured to produce the various colors, such as using a multi-color light-emitting diode (LED). Where the network status light 103 includes more than one physical light, then each of the physical lights may be dedicated to producing a different one of the colors and may be selectively used to produce the desired color at a given time. For instance, the network status light 103 may actually include both a green light-emitting element and a separate red light-emitting element.

Moreover, the network status indicator does not necessarily need to include any lights, and may be embodied in alternate ways. For example, the network status indicator may include one or more audio emitting devices, tactile output devices (e.g., vibration and/or braille devices) video displays, etc. Moreover, the network status indicator may be located entirely within the adapter 102, partially within the adapter 102 and on an external surface of the adapter 102, or entirely on an external surface of the adapter 102. Any status indication provided by the network status indicator may or may not be discernable from a location outside of the adapter 102. For example, it may be that the indication of the status is discernible only by opening a door of the adapter 102 or by probing the adapter 102 via an external device. The network status indicator may even be entirely external and/or physically separate from the adapter 102 itself, such as a network status indicator device that is connected wirelessly or via wire to the adapter 102.

As discussed above, the particular indications of status (e.g., colors and/or patterns) by the network status indicator may depend upon the particular device and/or the network standards used. For example, where the adapter 102 is an EtherNet/IP based adapter device, the adapter 102 may be configured to operate the network status indicator in accordance with the ODVA standard, such as that set forth in "The CIP Networks Library, Volume 2, EtherNet/IP Adaptation of CIP," published by ODVA. According to this standard, the network status indicator (when embodied as the network status light 103) may operate as follows, assuming that the network is configured such that only a single exclusive owner controls the adapter 102. Upon power-up or reset, the network status light 103 would alternately flash between green and red during power-on self-test (POST). Once POST is complete, the network status light 103 would turn off until an IP address for the adapter 102 is configured, at which point the network status light 103 would flash green. Then, once a Common Industrial Protocol (CIP) connection is established, the network status light 103 would emit a steady green. If the exclusive owner (e.g., scanner 101-A) subsequently times out (e.g., due to a lost network connection with the adapter 102), then the network status light 103 would begin flashing red. The network status light 103 would continue flashing red until an exclusive owner is established (for instance, when a previously-open-and-then-closed redundant owner connection is re-opened, or when a previously normally-closed redundant owner connection is opened).

Unfortunately, the existing ODVA network status light standard as described above does not adequately address the situation in which there are multiple redundant owners for a given adapter. For instance, under the existing ODVA network status light standard as discussed above, if one of the redundant owners (e.g., scanner 103-A) times out from a lost network connection with the adapter 102, then the network status light 103 of the adapter 102 would begin flashing red. While this may make sense in the environment of a single exclusive owner, this would likely be confusing to the user of the adapter 102 in a multiple redundant owner scenario. In other words, in a redundant owner scenario under the existing ODVA standard, the network status light 103 would flash red even though another of the redundant owners (e.g., scanner 103-B) may have immediately taken over as the new owner of the adapter 102. Thus, the ODVA-compliant network status light 103 would only take into account the status of the timed-out owner, and not the status of the new redundant owner. Thus, in a redundant owner scenario, the ODVA-compliant network status light 103 may operate in a misleading manner.

Another redundant-owner-scenario problem with the current ODVA standard is described below in connection with Tables 1A and 1B. In the example of Table 1A, scanner 101-A is the current owner, and all owner connections are available. In this case, the network status light may indicate a steady green. However, at a subsequent time, as shown in the example of Table 1B, one of the connections with one of the redundant owners (e.g., scanner 101-B) may be lost and timed out. Even if the lost connection is not the connection for the current redundant owner (scanner 101-A, according to Table 1A), and despite the fact that the adapter 102 actually still maintains a good connection with the current owner (scanner 101-A), the network status light 103 nevertheless may emit flashing red. This network status light operation also does not make sense and may be misleading to the user of the adapter 102.

TABLE 1A

| SCANNER | CONNECTION STATUS | OWNERSHIP | |
|---|---|---|---|
| 101-A | yes (open) | yes | network status light |
| 101-B | yes (open) | no | is STEADY |
| 101-C | yes (open) | no | GREEN |

TABLE 1B

| SCANNER | CONNECTION STATUS | OWNERSHIP | |
|---|---|---|---|
| 101-A | yes (open) | yes | network status light |
| 101-B | no - timed out or closed | no | is FLASHING RED, even though |
| 101-C | yes (open) | no | current owner maintains good connection |

Example embodiments showing how the ODVA standard may be modified to correct for problems such as these will be described further below.

Figure 2:
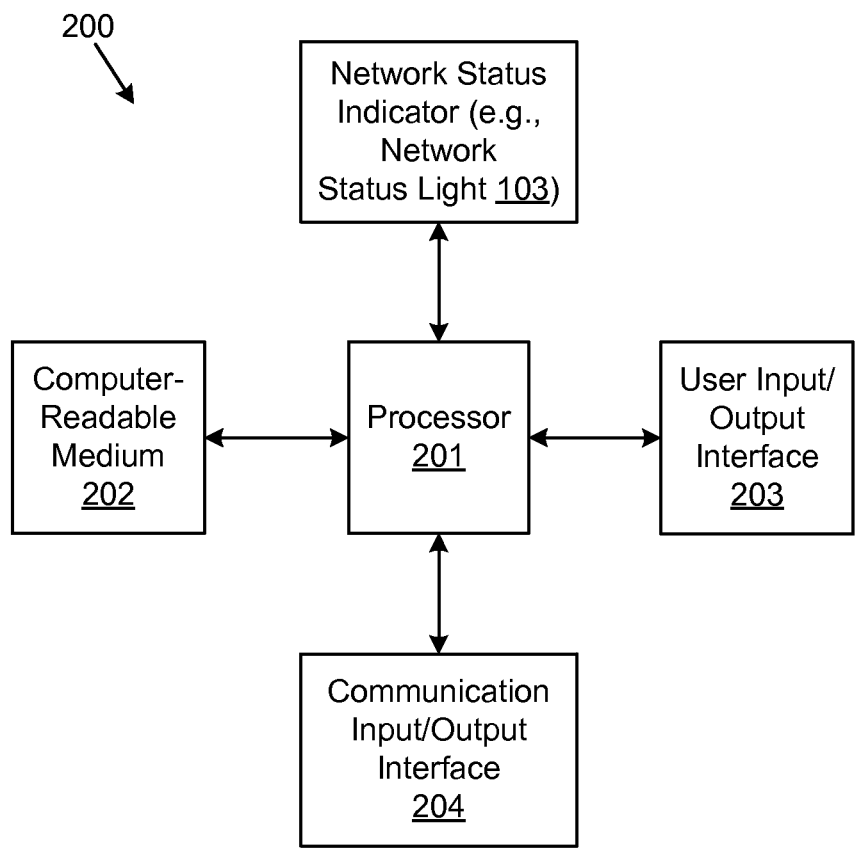
FIG. 2 is a block diagram of an example computing device, in accordance with one or more aspects as described herein.

FIG. 2 is a block diagram of an example computing device 200 that may be used to partially or fully embody any or all of the scanners 101 and/or the adapter 102 of FIG. 1 (and any other devices in the network). Computing device 200 may include hardware that may execute software to perform specific functions. The software, if any, may be stored on a tangible and/or non-transitory computer-readable medium 202 in the form of computer-readable instructions. Computing device 200 may read those computer-readable instructions, and in response perform various steps as defined by those computer-readable instructions. Thus, any functions, steps, calculations, devices, and other elements described herein may be may be implemented by a computer, such as by reading and executing computer-readable instructions for performing those functions, and/or by any hardware subsystem (e.g., a processor 201, such as a central processing unit, and/or other circuitry) from which computing device 200 is composed. Additionally or alternatively, any of the above-mentioned functions may be implemented by the hardware of computing device 200, with or without the execution of software. For example, computing device 200 may be or include one or more microprocessors, central processing units (CPUs), and/or other types of circuitry configured to perform some or all of the functions attributed to computing device 200. In such embodiments, processor 201 may be implemented as or otherwise include the one or more microprocessors, CPUs, ASICs, and/or other types of circuitry.

A computing device may include any electronic, electro-optical, and/or mechanical device, or system of multiple physically separate or integrated such devices, that is able to process and manipulate information, such as in the form of data. Non-limiting examples of a computing device include one or more personal computers (e.g., desktop, tablet, or laptop), mainframes, servers, cellular phones (which may be "smart phones"), personal digital assistants, and/or a system of these in any combination or sub-combination. In addition, a given computing device may be physically located completely in one location or may be distributed amongst a plurality of locations (i.e., may implement distributive computing). A computing device may be or otherwise include a general-purpose computing device and/or a dedicated computing device configured to perform only certain limited functions.

Computer-readable medium 202 may include not only a single tangible and/or non-transitory medium or single type of such medium, but also a combination of one or more such media and/or types of such media. Examples of embodiments of computer-readable medium 202 include, but are not limited to, one or more memories, hard drives, optical discs (such as CDs or DVDs), magnetic discs, and magnetic tape drives. Computer-readable medium 202 may be physically part of, or otherwise accessible by, computing device 200, and may store computer-readable instructions (e.g., software) and/or computer-readable data (i.e., information that may or may not be executable).

Computing device 200 may also include a user input/output interface 203 for receiving input from a user (e.g., via a keyboard, mouse, touch screen, an audio microphone, camera, and/or remote control) and/or for providing output to the user (e.g., via a touch screen or other display device, an audio speaker or piezoelectric element, a printer, and/or the network status indicator). Computing device 200 may further include a communication input/output interface 204 for communicating with other devices, such as other devices on the network, via wire and/or wirelessly.

Figure 3:
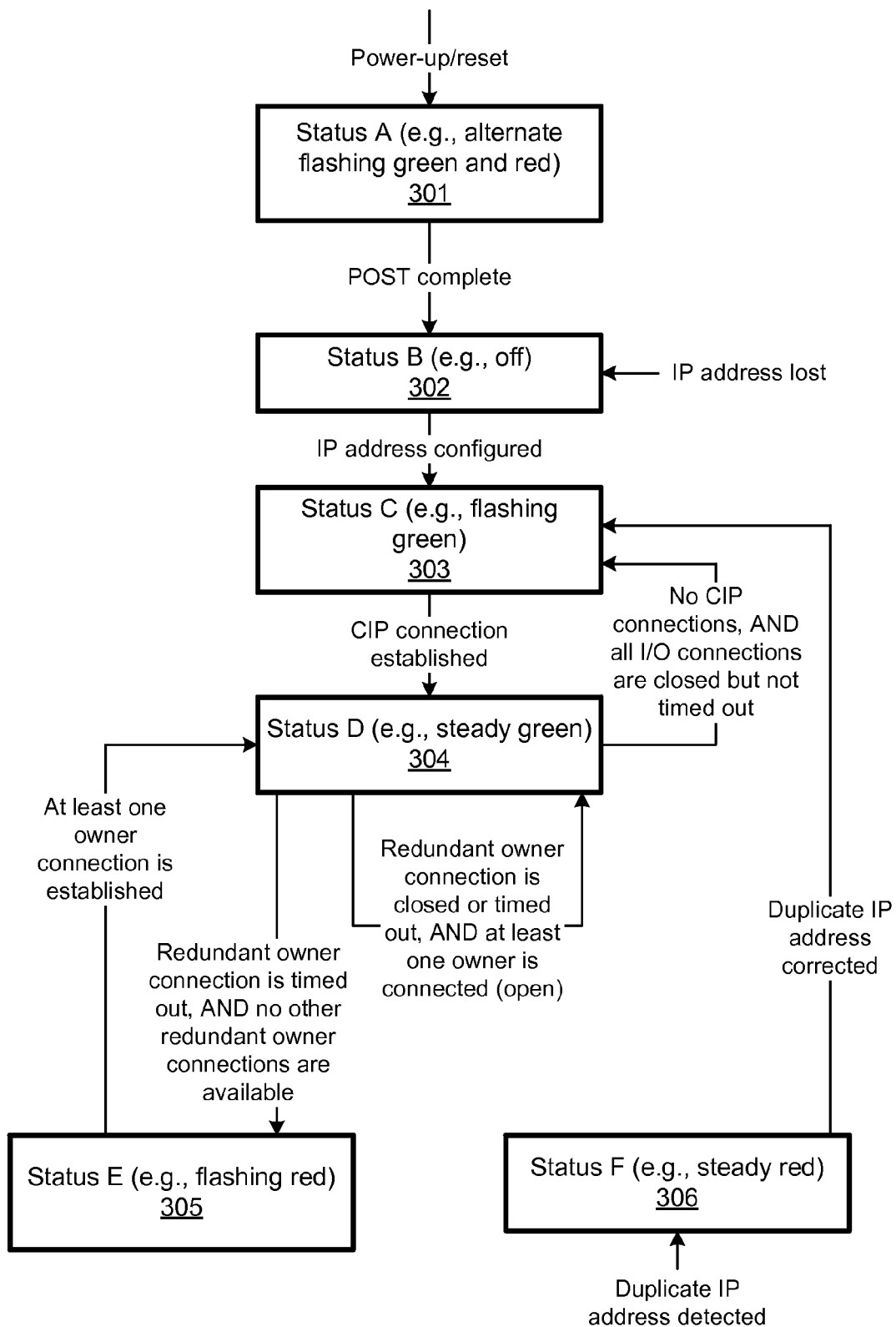
FIG. 3 is a flowchart of example steps that may be performed, in accordance with one or more aspects as described herein.

As discussed previously, the network status indicator (e.g., the network status light 103), when compliant with the above-mentioned ODVA standard, may misleadingly emit a flashing red light when an owner connection is timed out, even though a redundant owner may have successfully taken over, or even though the timed-out connection is not the connection to the current redundant owner. FIG. 3 is a flow chart showing example steps that may be performed by the adapter 102 in order to provide a more useful network status indication in a redundant owner network configuration.

In accordance with the example of FIG. 3, during POST of the adapter 102, the network status indicator may alternately flash between green and red or provide some other type of appropriate indication of status, referred to generically herein as "Status A" (step 301). Upon completion of POST, the network status indicator may turn off or provide some other appropriate indication of status, referred to generically herein as "Status B" (step 302) until the adapter 102 determines that an IP address of the adapter 102 has been configured. At that point, the network status indicator may emit flashing green or provide another appropriate indication of status, referred to generically herein as "Status C" (step 303). Once the adapter 102 detects that an owner connection has been established with one of the redundant owners (e.g., scanner 101-A), the network status light 103 may emit steady green or present yet another appropriate indication of status, referred to generically herein as "Status D", (step 304), which would indicate a normal network status.

If the network adapter 102 detects that the owner connection with the current owner is lost or purposely closed during normal network status, then it may be expected that another of the redundant owners (e.g., scanner 101-B) may take over as the new current owner. As long as the adapter 102 detects that there is a redundant owner that has taken over within a pre-determined timeout period (as measured by the adapter 102) after the original CIP connection is lost, the process may remain at step 304, and thus the network status indicator may continue to indicate Status D, e.g., a steady green. This is in contrast to the previously-discussed conventional ODVA standard, in which the loss of a redundant owner would cause the network status light to begin flashing red, even if another redundant owner successfully took over.

If, however, the adapter 102 does not detect a new redundant owner that has taken over within the timeout period, then the process may move to step 305, in which the network status indicator would begin emitting flashing red or provide another appropriate indication of status, referred to generically herein as "Status E." Thus, Status E (e.g., flashing red) may be presented only if the current redundant owner connection has timed out and there are no available redundant owners within the timeout period. If, at any time while the process is at step 305, the adapter 102 detects that one of the redundant owners takes over as the current owner, then the process may move back to step 304, such that the network status indicator would again provide Status D (e.g., emit a steady green).

Also, if the adapter 102 detects that there are no CIP connections available, and if all I/O connections have been purposely closed (not timed out), then the process may move from step 304 to step 303, such that the network status indicator may begin indicating Status C (e.g., by emitting a flashing green). This may distinguish between the situation where there is no owner due to a timeout (e.g., flashing red) and the situation where there is no owner due to purposely closing the connections (e.g., flashing green).

If, at any time, the adapter 102 determines that the IP address of the adapter 102 is lost, then the process may move to step 302, such that the network status indicator indicates Status B (e.g., the network status light 103 turns off). The network status indicator may remain at Status B until an IP address is configured, at which point the process may again move to step 303 as previously described. And, if at any time the adapter 102 determines that there is duplicate IP address in the network that is the same as the IP address of the adapter 102, then the process may move to step 306, in which the network status indicator would emit steady red or provide yet another appropriate status indication, referred to herein generically as "Status F." The Status F indication would continue until the network adapter 102 determines that the duplicate IP address situation has been corrected, at which point the process may move back to step 303, and the network status indicator may again indicate Status C (e.g., by emitting a flashing green color) as described previously.

Thus, as shown by way of example in Tables 2A and 2B below, where the network status indicator includes the network status light 103, the network status light 103 may remain a steady green, even if the adapter 102 detects that the connection is lost by a non-current-owner. Tables 2A and 2B are shown in time order. That is the scenario of Table 2B occurs after the scenario of Table 2A.

TABLE 2A

| SCANNER | CONNECTION STATUS TO ADAPTER | OWNERSHIP OF ADAPTER | |
|---|---|---|---|
| 101-A | yes (open) | yes | network status light |
| 101-B | yes (open) | no | is STEADY |
| 101-C | yes (open) | no | GREEN |

TABLE 2B

| SCANNER | CONNECTION STATUS TO ADAPTER | OWNERSHIP OF ADAPTER | |
|---|---|---|---|
| 101-A | yes (open) | yes | network status light |
| 101-B | no - timed out or closed | no | remains STEADY GREEN |
| 101-C | yes (open) | no | |

And, as shown in Tables 3A and 3B below, the network status light 103 may remain a steady green if adapter 102 detects that the current owner connection is lost, as long as the adapter 102 detects that another redundant owner has taken over. Tables 3A and 3B are shown in time order. That is the scenario of Table 3B occurs after the scenario of Table 3A. Referring to Table 3C below, if all of the redundant owners assigned to the adapter 102 are not available to take over as the current owner because the connections to the redundant owners have timed out, then the process of FIG. 3 would move to step 305, and the network status light 103 would change to a flashing red. If all of the redundant owners are not available because all of the connections were purposely closed (rather than merely having timed out), then the process of FIG. 3 would move to step 303, and the network status light 103 would change to a flashing green.

TABLE 3A

| SCANNER | CONNECTION STATUS TO ADAPTER | OWNERSHIP OF ADAPTER | |
|---|---|---|---|
| 101-A | yes (open) | yes | network status light |
| 101-B | yes (open) | no | 103 is STEADY |
| 101-C | yes (open) | no | GREEN |

TABLE 3B

| SCANNER | CONNECTION STATUS TO ADAPTER | OWNERSHIP OF ADAPTER | |
|---|---|---|---|
| 101-A | no - timed out or closed | no | network status light 103 remains STEADY |
| 101-B | yes (open) | yes - took over | GREEN |
| 101-C | yes (open) | no | |

TABLE 3C

| SCANNER | CONNECTION STATUS TO ADAPTER | OWNERSHIP OF ADAPTER | |
|---|---|---|---|
| 101-A | no - timed out or closed | no | network status light 103 begins |
| 101-B | no - timed out or closed | no | FLASHING GREEN if all connections |
| 101-C | no - timed out or closed | no | are closed but not from timing out, and FLASHING RED if the current connection has timed out and no open redundant connections are available |

This mode of operation of the adapter 102 and the network status indicator may be much less confusing for the user of the adapter 102. Now, under a redundant owner scenario, as long as the adapter 102 has at least one owner with a good connection (and assuming that there is no duplicate IP address or other problem), the network status indicator may, for example, emit a steady green, showing the user that the adapter 102 is exchanging IO data.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present disclosure. For example, while various light-based status indications have been discussed (e.g., steady green, flashing red, etc.), other types of status indications may be presented by the network status indicator. Examples of such other types of status indications may include intermittent or continuous vibrations, intermittent or continuous sounds, such as at specific frequencies or tones, specific video display outputs, specific braille outputs, and the like.

The invention claimed is:
1. A method, comprising:
    determining, by an adapter device in an EtherNet/IP network, whether a first redundant owner connection between the adapter device and a first scanner device is open; and
    if it is determined that the first redundant owner connection is not open, then causing a network status indicator of the adapter device to indicate a first status if a second redundant owner connection between the adapter device and a second scanner device is open, and to indicate a second status or a third status if no redundant owner connection to the adapter device is open.
2. The method of claim 1, further comprising:
    determining, by the adapter device, whether at least one redundant owner connection has been established while the network status indicator is indicating the second status; and
    if so, causing the network status indicator to indicate the first status.
3. The method of claim 1, further comprising causing the network status indicator to indicate the third status if all of the redundant owner connections to the adapter device have been closed without timing out.
4. The method of claim 1, further comprising causing the network status indicator to indicate the second status when a current redundant owner connection to the adapter device has timed out and no other redundant owner connections to the adapter device are available.

5. The method of claim 1, wherein determining that the first redundant owner connection is open comprises determining that the first redundant owner connection has not closed or timed out.

6. The method of claim 1, wherein the network status indicator comprises a network status light, said causing the network status indicator to indicate the first status comprises causing the network status light to emit a solid green color, said causing the network status indicator to indicate the second status comprises causing the network status light to emit a flashing red color, and said causing the network status indicator to indicate the third status comprises causing the network status light to emit a flashing green color.

7. An apparatus, comprising:
a processor;
a network status indicator; and
a communication interface configured to be coupled to a network,
wherein the processor is configured to:
cause the network status indicator to indicate a first status when at least one of a plurality of redundant owner connections to the communication interface is open, even if another of the plurality of redundant owner connections is closed or timed out, and
cause the network status indicator to indicate a second status or a third status when there are no open redundant owner connections to the communication interface,
wherein the apparatus comprises an adapter and the network comprises an EtherNet/IP network.

8. The apparatus of claim 7, wherein the processor is further configured to:
cause the network status indicator to indicate the second status when a current one of the redundant owner connections to the communication interface has timed out and no other ones of the redundant owner connections are available; and
cause the network status indicator to indicate the third status when all of the redundant owner connections to the communications interface have been closed without timing out.

9. The apparatus of claim 7, wherein the processor is further configured to cause the network status indicator to again indicate the first status when one of the plurality of redundant owner connections to the communication interface is established.

10. The apparatus of claim 7, wherein the processor is configured to cause the network status indicator to indicate the second status or the third status only when there are no open redundant owner connections to the communication interface.

11. The apparatus of claim 7, wherein the network status indicator comprises a network status light, the processor is configured to cause the network status indicator to indicate the first status by causing the network status light to emit a solid green color, the processor is configured to cause the network status indicator to indicate the second status by causing the network status light to emit a flashing red color, and the processor is configured to cause the network status indicator to indicate the third status by causing the network status light to emit a flashing green color.

12. An apparatus, comprising:
a processor; and
a network status light,
wherein the processor is configured to:
determine whether a first redundant owner connection between the apparatus and a first scanner is open; and
if it is determined that the first redundant owner connection is not open, cause the network status light to emit a solid green color if a second redundant owner connection between the apparatus and a second scanner is open, and to emit a flashing red color or a flashing green color if no redundant owner connection to the apparatus is open,
wherein the apparatus comprises an adapter configured to communicate with an EtherNet/IP network.

13. The apparatus of claim 12, wherein the processor is further configured to determine whether at least one redundant owner connection has been established while the network status light is emitting the flashing red color or the flashing green color, and if so, to cause the network status light to emit the solid green color.

14. The apparatus of claim 12, wherein determining that the first redundant owner connection is open comprises determining that the first redundant owner connection has not closed or timed out.

15. The apparatus of claim 12, wherein the processor is further configured to:
cause the network status light to emit the flashing red color when a current redundant owner connection to the apparatus has timed out and no other redundant owner connections are available; and
cause the network status light to emit the flashing green color when all redundant owner connections to the apparatus have been closed without timing out.

16. The apparatus of claim 12, wherein the first scanner and the adapter are configured to communicate through a producer-consumer relationship.

17. The apparatus of claim 12, wherein the processor is further configured to cause the network status light to again emit a solid green color when one of a plurality of redundant owner connections to the apparatus is established.

18. The apparatus of claim 12, wherein the processor is further configured to cause the network status light to emit the flashing red color or the flashing green color only when there are no open redundant owner connections to the apparatus.

* * * * *